United States Patent
Lin et al.

(10) Patent No.: US 12,157,815 B2
(45) Date of Patent: Dec. 3, 2024

(54) POLYIMIDE RESIN COMPOSITION, POLYIMIDE RESIN ADHESIVE LAYER, LAMINATE, AND MANUFACTURING METHOD OF ELECTRONIC COMPONENT

(71) Applicant: eChem Solutions Corp., Taoyuan (TW)

(72) Inventors: Yung-Yu Lin, Taoyuan (TW); Chi-Yu Lai, Taoyuan (TW); Che-Wei Chang, Taoyuan (TW)

(73) Assignee: eChem Solutions Corp., Taoyuan (TW)

( * ) Notice: Subject to any disclaimer, the term of this patent is extended or adjusted under 35 U.S.C. 154(b) by 652 days.

(21) Appl. No.: 17/352,371

(22) Filed: Jun. 21, 2021

(65) Prior Publication Data
US 2022/0275205 A1    Sep. 1, 2022

(30) Foreign Application Priority Data
Feb. 26, 2021 (TW) ................. 110106927

(51) Int. Cl.
*C08L 79/08* (2006.01)
*C08G 73/10* (2006.01)
(Continued)

(52) U.S. Cl.
CPC .......... *C08L 79/08* (2013.01); *C08G 73/1007* (2013.01); *C08G 73/121* (2013.01);
(Continued)

(58) Field of Classification Search
None
See application file for complete search history.

(56) References Cited

FOREIGN PATENT DOCUMENTS

| CN | 103739842 | 4/2014 |
|---|---|---|
| CN | 105001421 | 10/2015 |

(Continued)

OTHER PUBLICATIONS

"Office Action of China Counterpart Application", issued on Jan. 30, 2024, p. 1-p. 9.

*Primary Examiner* — Randy P Gulakowski
*Assistant Examiner* — Ha S Nguyen
(74) *Attorney, Agent, or Firm* — JCIPRNET (57) ABSTRACT

A polyimide resin composition, a polyimide resin adhesive layer, a laminate, and a manufacturing method of an electronic component are provided. The polyimide resin composition includes a polyimide resin. The polyimide resin is obtained by the polymerization reaction of a diamine (A) and a tetracarboxylic dianhydride (B). The diamine (A) includes a diamine (A-1) represented by following Formula (I-1) and a diamine (A-2) represented by following Formula (I-2). A molar ratio ((A-1):(A-2)) of the diamine (A-1) to the diamine (A-2) is 0.1:0.2 to 0.6.

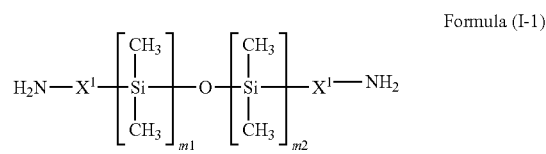

Formula (I-1)

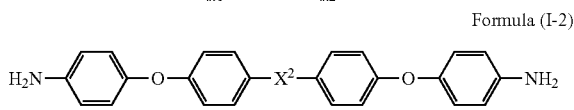

Formula (I-2)

14 Claims, 3 Drawing Sheets

(51) Int. Cl.
    *C08G 73/12*     (2006.01)
    *C09J 7/38*     (2018.01)
    *C09J 7/40*     (2018.01)
    *C09J 179/08*     (2006.01)

(52) U.S. Cl.
    CPC ............. *C09J 7/38* (2018.01); *C09J 7/405* (2018.01); *C09J 179/08* (2013.01)

(56) References Cited

FOREIGN PATENT DOCUMENTS

| | | |
|---|---|---|
| CN | 106029744 | 10/2016 |
| CN | 106800908 | 6/2017 |
| CN | 106519685 | 6/2019 |
| CN | 112029098 | 12/2020 |
| JP | H09286859 | 11/1997 |
| JP | 11335652 A * | 12/1999 |
| JP | 2002343944 A * | 11/2002 |
| JP | 2007056167 | 3/2007 |
| JP | 2008091478 A * | 4/2008 |
| JP | 2011063678 | 3/2011 |
| JP | 2020055147 | 4/2020 |
| KR | 20150027599 | 3/2015 |
| TW | I447269 | 8/2014 |
| TW | 201612016 | 4/2016 |
| TW | I634182 | 9/2018 |
| TW | I667313 | 8/2019 |
| TW | I680700 | 12/2019 |

\* cited by examiner

POLYIMIDE RESIN COMPOSITION, POLYIMIDE RESIN ADHESIVE LAYER, LAMINATE, AND MANUFACTURING METHOD OF ELECTRONIC COMPONENT

CROSS-REFERENCE TO RELATED APPLICATION

This application claims the priority benefit of Taiwan application serial no. 110106927, filed on Feb. 26, 2021. The entirety of the above-mentioned patent application is hereby incorporated by reference herein and made a part of this specification.

BACKGROUND

Technical Field

The disclosure relates to a resin composition, an adhesive layer, a laminate, and a manufacturing method of an electronic component, and particularly relates to a polyimide resin composition, a polyimide resin adhesive layer, a laminate, and a manufacturing method of an electronic component.

Description of Related Art

In recent years, with the development of electronic devices in the direction of lighter and thinner, in order to make the electronic devices meet the requirements for subsequent packaging, the thickness of substrates applied to the electronic devices has been thinned to more than 1 μm and less than 100 μm to be processed. In the processing step, in order to prevent the substrates for forming the electronic devices from cracking, the substrates for forming the electronic devices are usually fixed on a support substrate through a temporary adhesive by mechanical pressurization. After the processing step is completed, the processed substrates for forming the electronic devices are peeled off from the support substrate. Finally, an organic solvent or alkaline solution is used to remove the residual glue on the substrate and the support substrate.

It is noted that the temporary adhesive plays an important role in the processing step. Since the processing step may go through high temperature and chemical processes, the temporary adhesive is not only required to have adhesion, heat resistance, and chemical resistance, but also required to be easily peeled off in the subsequent peeling step. However, although polyamide or polyimide having heat resistance has been developed as the temporary adhesive, the requirements for chemical resistance and adhesion are still not met.

SUMMARY

In view of the above, the disclosure provides a polyimide resin composition having good chemical resistance and adhesion, a polyimide resin adhesive layer formed by the polyimide resin composition, a laminate including the polyimide resin adhesive layer, and a manufacturing method of an electronic component.

The disclosure provides a polyimide resin composition including a polyimide resin. The polyimide resin is essentially obtained by a polymerization reaction of a diamine (A) and a tetracarboxylic dianhydride (B). The diamine (A) includes a diamine (A-1) represented by following Formula (I-1) and a diamine (A-2) represented by following Formula (I-2). A molar ratio ((A-1):(A-2)) of the diamine (A-1) to the diamine (A-2) is 0.1:0.2 to 0.6.

Formula (I-1)

In Formula (I-1), m1 is an integer of 1 to 3, m2 is an integer of 1 to 3, and each $X^1$ is an alkyl group having a carbon number of 1 to 5 or a phenylene group. When $X^1$ is the alkyl group having a carbon number of 1 to 5, any —$CH_2$— in the alkyl group having a carbon number of 1 to 5 may be substituted by —NH—.

Formula (I-2)

In Formula (I-2), $X^2$ is a hydrocarbon group having a carbon number of 1 to 10, —O—, —S—, —$SO_2$—, —NH—, —$C(CF_3)_2$—, or In an embodiment of the disclosure, the diamine (A) further includes a diamine (A-3) represented by following Formula (I-3). A molar ratio ((A):(A-3)) of the diamine (A) to the diamine (A-3) is 1:greater than 0 to less than or equal to 4.

Formula (I-3)

In Formula (I-3), Y is —$C(CH_3)_2$—, —$C(CF_3)_2$—, —$CH_2$—, —O—, —S—, or —$SO_2$—.

In an embodiment of the disclosure, the diamine (A) further includes a 3,4'-diaminodiphenyl ether.

In an embodiment of the disclosure, the tetracarboxylic dianhydride (B) includes a 3,3',4,4'-diphenyl ether tetracarboxylic dianhydride.

The disclosure also provides a polyimide resin composition including a polyimide resin. The polyimide resin includes a structural unit represented by general Formula (1).

Formula (1)

In Formula (1), $Ar^1$ is a tetravalent organic group, and $Ar^2$ is a group represented by following Formula (1-1) or a group represented by following Formula (1-2). A molar ratio of the group represented by Formula (1-1) to the group represented by Formula (1-2) is 0.1:0.2 to 0.6.

Formula (1-1)

In Formula (1-1), m1 is an integer of 1 to 3, m2 is an integer of 1 to 3, and each $X^1$ is an alkyl group having a carbon number of 1 to 5 or a phenylene group. When $X^1$ is the alkyl group having a carbon number of 1 to 5, any —$CH_2$— in the alkyl group having a carbon number of 1 to 5 may be substituted by —NH—. * represents the bonding position.

Formula (1-2)

In Formula (1-2), $X^2$ is a hydrocarbon group having a carbon number of 1 to 10, —O—, —S—, —$SO_2$—, —NH—, —$C(CF_3)_2$—, or

* represents the bonding position.

In an embodiment of the disclosure, the polyimide resin further includes a structural unit represented by general Formula (2).

Formula (2)

In Formula (2), $Ar^1$ is a tetravalent organic group, and $Ar^3$ is a group represented by following Formula (2-1). A molar ratio of the group represented by Formula (1-1) to the group represented by Formula (2-1) is 1:greater than 0 to less than or equal to 4.

Formula (2-1)

In Formula (2-1), Y is —$C(CH_3)_2$—, —$C(CF_3)_2$—, —$CH_2$—, —O—, —S—, or —$SO_2$—. * represents the bonding position.

In an embodiment of the disclosure, the polyimide resin further includes a structural unit represented by general Formula (3).

Formula (3)

In Formula (3), $Ar^1$ is a tetravalent organic group, and $Ar^4$ is a group represented by following Formula (3-1)

Formula (3-1)

In Formula (3-1), * represents the bonding position.

In an embodiment of the disclosure, $Ar^1$ in the above Formulas (1) to (3) is a group represented by following Formula (1-a).

Formula (1-a)

In Formula (1-a), * represents the bonding position.

The disclosure provides a polyimide resin adhesive layer, which is formed by the polyimide resin composition.

The disclosure provides a laminate including the polyimide resin adhesive layer having a first surface and a second surface opposite to each other; a first substrate bonded to the first surface of the polyimide resin adhesive layer; a release layer having a third surface and a fourth surface opposite to each other, and the third surface of the release layer bonded to the second surface of the polyimide resin adhesive layer; a second substrate bonded to the fourth surface of the release layer; and an electronic component embedded in the polyimide resin adhesive layer and connected to the release layer.

The disclosure provides a manufacturing method of an electronic component including the following steps. The laminate is provided. The release layer and the second substrate are removed from the laminate to expose the second surface of the polyimide resin adhesive layer and a part of the electronic component. The polyimide resin adhesive layer and the first substrate are removed.

In an embodiment of the disclosure, the electronic component is a light emitting diode.

Based on the above, the disclosure provides a polyimide resin composition, which includes a polyimide resin synthesized by diamine having silicon-oxygen bond and diamine having four benzene rings in the molar ratio of 0.1:0.2 to 0.6. The polyimide resin composition has good chemical resistance and adhesion, and is suitable for the manufacture of electronic components. In addition, the disclosure also provides a polyimide resin adhesive layer formed by the polyimide resin composition, a laminate including the temporary adhesive layer, and a manufacturing method of an electronic component.

DESCRIPTION OF THE EMBODIMENTS

This embodiment provides a polyimide resin composition, a polyimide resin adhesive layer formed by the polyimide resin composition, a laminate, and a manufacturing method of an electronic component. Hereinafter, detailed description will be given.

In the text, it should be noted that the so-called "hydrocarbyl group" represents an organic group composed only of carbon and hydrogen. The organic group is, for example, an alkyl group, an alkenyl group, or an alkynyl group. In addition, the hydrocarbyl group may be a linear hydrocarbyl group, a branched hydrocarbyl group, or a cyclic hydrocarbyl group.

In the text, the so-called "tetravalent organic group" is an organic group having four bonding positions, and the "tetravalent organic group" may form four chemical bonds through the four bonding positions.

In the text, the so-called "divalent organic group" is an organic group having two bonding positions, and the "divalent organic group" may form two chemical bonds through the two bonding positions.

<Polyimide Resin Composition>

A polyimide resin composition according to this embodiment includes a polyimide resin. Monomers constituting the polyimide resin and the preparation method will be described in detail below.

Polyimide Resin Monomers

The polyimide resin is essentially obtained by a polymerization reaction of a diamine (A) and a tetracarboxylic dianhydride (B). Hereinafter, the various monomers will be described in detail.

Diamine (A)

The diamine (A) includes a diamine (A-1) and a diamine (A-2). Moreover, the diamine (A) may further include a diamine (A-3). In addition, the diamine (A) may further include another diamine (A-4) without affecting the efficacy of this embodiment.

Diamine (A-1)

The diamine (A-1) is a diamine having silicon-oxygen bond. Specifically, the diamine (A-1) is a compound represented by following Formula (I-1).

Formula (I-1)

In Formula (I-1), m1 is an integer of 1 to 3, m2 is an integer of 1 to 3, and preferably both m1 and m2 are 1; and each $X^1$ is an alkyl group having a carbon number of 1 to 5 or a phenylene group. When $X^1$ is the alkyl group having a carbon number of 1 to 5, any —$CH_2$— in the alkyl group having a carbon number of 1 to 5 may be substituted by —NH—. $X^1$ is preferably the alkyl group having a carbon number of 1 to 5 or —$CH_2CH_2NHCH_2$—. $X^1$ is more preferably propylene.

In an embodiment, the diamine (A-1) may be a compound represented by following Formula (I-1-1).

Formula (I-1-1)

In Formula (I-1-1), m1 is an integer of 1 to 3, m2 is an integer of 1 to 3, and preferably both m1 and m2 are 1; and n1 is an integer of 1 to 5, n2 is an integer of 1 to 5, preferably both n1 and n2 are an integer of 1 to 3, and more preferably both n1 and n2 are 3.

Specific examples of the diamine (A-1) include, but are not limited to, 1,3-bis-(3-aminopropyl)-1,1,3,3-tetramethyldisiloxane, 1,3-bis-(2-aminoethylaminomethyl)tetramethyldisiloxane, 1,3-bis(4-aminophenyl)-1,1,3,3-tetramethyldisiloxane, or a combination thereof, and preferably 1,3-bis(3-aminopropyl)-1,1,3,3-tetramethyldisiloxane.

Diamine (A-2)

The diamine (A-2) is a diamine having four benzene rings. Specifically, the diamine (A-2) is a compound represented by following Formula (I-2).

Formula (I-2)

In Formula (I-2), $X^2$ is a hydrocarbon group having a carbon number of 1 to 10, —O—, —S—, —$SO_2$—, —NH—, —$C(CF_3)_2$—, or preferably an alkyl group having a carbon number of 1 to 5 or —$C(CF_3)_2$—, and more preferably an alkyl group having a carbon number of 3. A specific example of the alkyl group having a carbon number of 3 is preferably —$C(CH_3)_2$—.

Specific examples of the diamine (A-2) include 2,2'-Bis[4-(4-aminophenoxy)phenyl]propane (BAPP), 2,2-bis[4-(4-aminophenoxy)phenyl]hexafluoropropane, bis[4-(4-aminophenoxy)phenyl]sulfone, or a combination thereof, and more preferably 2,2'-bis[4-(4-aminophenoxy)phenyl]propane.

A molar ratio ((A-1):(A-2)) of the diamine (A-1) to the diamine (A-2) may be 0.1:0.2 to 0.6, and preferably 0.4 to 0.6. When the molar ratio of the diamine (A-1) to the diamine (A-2) is within the above range, the polyimide resin composition has good chemical resistance and adhesion, and is suitable for the manufacture of electronic components. In addition, when the molar ratio ((A-1):(A-2)) of the diamine (A-1) to the diamine (A-2) is not within the above range, the polyimide resin composition cannot have good chemical resistance and adhesion at the same time and cannot be applied to the manufacture of electronic components. Furthermore, when the molar ratio ((A-1):(A-2)) of the diamine (A-1) to the diamine (A-2) is 0.1:greater than 0.6, the adhesion of the polyimide resin composition is poor. When the molar ratio ((A-1):(A-2)) of the diamine (A-1) to the diamine (A-2) is 0.1:less than 0.2, the chemical resistance of the polyimide resin composition is poor.

Diamine (A-3)

In an embodiment, the diamine (A) may further include the diamine (A-3). The diamine (A-3) is a diamine having a phenol structure. Specifically, the diamine (A-3) is a compound represented by following Formula (I-3).

Formula (I-3)

In Formula (I-3), Y is —C(CH$_3$)$_2$—, —C(CF$_3$)$_2$—, —CH$_2$—, —O—, —S—, or —SO$_2$—, preferably —C(CH$_3$)$_2$— or —C(CF$_3$)$_2$—, and more preferably —C(CH$_3$)$_2$—.

Specific examples of the diamine (A-3) include 2,2-bis(3-amino-4-hydroxyphenyl)propane (BAHPP), 2,2-bis(3-amino-4-hydroxyphenyl)hexafluoropropane, 2,2-bis(3-amino-4-hydroxyphenyl)sulfone, or a combination thereof, and preferably include 2,2-bis(3-amino-4-hydroxyphenyl)propane.

The molar ratio ((A):(A-3)) of the diamine (A) to the diamine (A-3) may be 1:greater than 0 to less than or equal to 4, and preferably 1:2 to 4. When the molar ratio of the diamine (A) to the diamine (A-3) is within the above range, the polyimide resin composition has better chemical resistance and adhesion.

Another Diamine (A-4)

Without affecting the efficacy of this embodiment, the diamine (A) may further include another diamine (A-4). The another diamine (A-4) is not particularly limited and may be appropriately selected according to requirements.

Specific examples of the another diamine (A-4) may include 3,4'-diaminodiphenyl ether, 3,3-diaminodiphenyl ether, 4,4-diaminodiphenyl ether, 3,4-diaminodiphenyl sulfone, 4,4-diaminodiphenyl sulfone, bis[4-(3-aminophenoxy)phenyl]sulfone, bis(4-amino-3-carboxyphenyl)methane, or a combination thereof, and preferably include 3,4'-diaminodiphenyl ether.

The molar ratio of the diamine (A) to the tetracarboxylic dianhydride (B) described later may be 0.5 or 1.2:1, and preferably 0.9 to 1.1:1.

Tetracarboxylic Dianhydride (B)

The tetracarboxylic dianhydride (B) is not particularly limited, and an appropriate tetracarboxylic dianhydride may be selected according to requirements.

Specific examples of the tetracarboxylic dianhydride (B) may include 3,3',4,4'-diphenyl ether tetracarboxylic dianhydride (ODPA), bicyclo[2.2.2]oct-7-ene-2,3,5,6-tetracarboxylic dianhydride (BTA), 1,2,4,5-cyclohexanetetracarboxylic dianhydride, 5-(2,5-dioxtetrahydrofuran)-3-methyl-3-cyclohexene-1,2-dicarbonic anhydride, 3,3',4,4'-benzophenone tetracarboxylic dianhydride, 2,3,3',4'-diphenyl ether tetracarboxylic dianhydride, 1,2,3,4-cyclobutane tetracarboxylic dianhydride, pyromellitic dianhydride, bis(3,4-dicarboxyphenyl) ether dianhydride, bis(3,4-dicarboxyphenyl)sulfide dianhydride, bis(3,4-dicarboxylphenyl) sulfone dianhydride, bis(3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 1,2,3,4-cyclopentanetetracarboxylic dianhydride, 1,2,4,5-cyclohexanetetracarboxylic dianhydride, bicyclo [2.2.1]heptane-2,3,5,6-tetracarboxylic dianhydride, bicyclo[2.2.2]oct-7-ene-2,3,5,6-tetracarboxylic dianhydride, bicyclo[2.2.2]octane-2,3,5,6-tetracarboxylic dianhydride, or a combination thereof, and preferably include 3,3',4,4'-diphenyl ether tetracarboxylic dianhydride, bicyclo [2.2.2]oct-7-ene-2,3,5,6-tetracarboxylic dianhydride, or a combination thereof, and more preferably 3,3',4,4'-diphenyl ether tetracarboxylic dianhydride.

Preparation of Polyimide Resin

The tetracarboxylic dianhydride and the diamine may form a polyamide acid polymer through the polymerization reaction. Next, a cyclodehydration reaction is performed, so that an amide acid functional group in the polyamide acid polymer is converted into an imide functional group (i.e. imidized) through the cyclodehydration reaction to obtain a polyimide resin including the imide functional group.

The polymerization reaction and the cyclodehydration reaction may be performed in the presence of a solvent. The solvent may include polar solvents such as N-methylpyrrolidone, γ-butyrolactone, dimethylacetamide, methylformamide, diethylacetamide, 1,3-dimethyl-2-imidazolidinone, N-methylcaprolactam, and hexamethylphosphoramide. The solvents may be used alone or in combination of multiple types. In terms of the solubility of reactants, the solvent is preferably N-methylpyrrolidone. However, this embodiment is not limited thereto, and other solvents may also be selected according to requirements. Since the total amount of the tetracarboxylic dianhydride, the diamine, and the solvent for synthesizing the polyimide resin is 100% by weight, the content of the solvent used in the polymerization reaction may be 15 to 45% by weight, and preferably 20 to 35% by weight.

The temperature of the polymerization reaction may be 50 to 80° C., and the time may be 3 to 6 hours.

The cyclodehydration reaction may be performed by using a high temperature cyclodehydration method or a chemical cyclodehydration method. The temperature of the high temperature cyclodehydration method may be 250 to 350° C., and the time may be 3 to 6 hours. A dehydrating agent and a catalyst may be added in the reaction solution for the chemical cyclodehydration method, and reacts for 3 to 6 hours at a temperature of 160 to 180° C. The dehydrating agent is, for example, acid anhydrides such as acetic anhydride, propionic anhydride, and trifluoroacetic anhydride, but the disclosure is not limited thereto, and other dehydrating agents may also be selected according to requirements. The catalyst is, for example, a tertiary amine such as 1-ethylpiperidine, triethylamine, pyridine, and lutidine, but the disclosure is not limited thereto, and other catalysts may be selected according to requirements.

In addition, in another embodiment of the disclosure, a sealing agent may be further added in the polymerization reaction of the tetracarboxylic dianhydride and the diamine to control the molecular weight of the polyimide resin. The sealing agent is not particularly limited and may be any known in the art of the disclosure, including but not limited to 3-aminophenol, phthalic anhydride, maleic anhydride, nadic acid, cyclohexanedicarboxylic anhydride, 3-hydroxyphthalic anhydride, 3-carboxyphenol, 4-carboxyphenol, 3-carboxythiophenol, 4-carboxythiophenol, 1-hydroxy-7-carboxynaphthalene, 1-hydroxy-6-carboxynaphthalene, 1-hydroxy-5-carboxynaphthalene, 1-mercapto-7-carboxynaphthalene, 1-mercapto-6-carboxynaphthalene, 1-mercapto-5-carboxynaphthalene, 3-carboxybenzenesulfonic acid, 4-carboxybenzenesulfonic acid, or a combination thereof.

According to a polyimide resin of this embodiment, the polyimide resin includes a structural unit represented by general Formula (1).

Formula (1)

In Formula (1), $Ar^1$ is a tetravalent organic group, and $Ar^2$ is a group represented by following Formula (1-1) or a group represented by following Formula (1-2).

Specifically, the tetravalent organic group represented by $Ar^1$ may be derived from the tetracarboxylic dianhydride (B). In an embodiment, $Ar^1$ may be a group represented by following Formula (1-a) or a group represented by following Formula (1-b), and preferably a group represented by the following Formula (1-a).

Formula (1-a)

Formula (1-b)

The group represented by Formula (1-a) is derived from 3,3',4,4'-diphenyl ether tetracarboxylic dianhydride; and the group represented by Formula (1-b) may be derived from bicyclo[2.2.2]oct-7-ene-2,3,5,6-tetracarboxylic dianhydride.

Formula (1-1)

In Formula (1-1), m1 is an integer of 1 to 3, m2 is an integer of 1 to 3, and preferably both m1 and m2 are 1; and each $X^1$ is an alkyl group having a carbon number of 1 to 5 or a phenylene group. When $X^1$ is the alkyl group having a carbon number of 1 to 5, any —$CH_2$— in the alkyl group having a carbon number of 1 to 5 may be substituted by —NH—. $X^1$ is preferably the alkyl group having a carbon number of 1 to 5.

In an embodiment, $Ar^2$ may be a group represented by following Formula (1-1-a).

Formula (1-1-a)

In Formula (1-1-a), m1 is an integer of 1 to 3, m2 is an integer of 1 to 3, and preferably both m1 and m2 are 1; n1 is an integer of 1 to 5, n2 is an integer of 1 to 5, preferably each is an integer of 1 to 3, and more preferably both are 3; and * represents the bonding position.

Specific examples of Formula (1-1) include, but are not limited to, a group represented by following Formula (1-1-1), a group represented by following Formula (1-1-2), and a group represented by following Formula (1-1-3), and preferably the group represented by the following Formula (1-1-1).

Formula (1-1-1)

Formula (1-1-2)

Formula (1-1-3)

The group represented by Formula (1-1-1) may be derived from 1,3-bis(3-aminopropyl)-1,1,3,3-tetramethyldisiloxane. The group represented by Formula (1-1-2) may be derived from 1,3-bis-(2-aminoethylaminomethyl)tetramethyldisilane. The group represented by Formula (1-1-3) may be derived from 1,3-bis(4-aminophenyl)-1,1,3,3-tetramethyldisiloxane.

Formula (1-2)

In Formula (1-2), $X^2$ is a hydrocarbon group having a carbon number of 1 to 10, —O—, —S—, —SO$_2$—, —NH—, —C(CH$_3$)$_2$—, —C(CF$_3$)$_2$—, or preferably an alkyl group having a carbon number of 1 to 5 or —C(CF$_3$)$_2$—, and more preferably an alkyl group having a carbon number of 3; and * represents the bonding position.

A specific example of the alkyl group having a carbon number of 3 is preferably —C(CH$_3$)$_2$—.

Formula (1-2) may be a group represented by any one of the following Formulas (1-2-1) to (1-2-8), and preferably a group represented by Formula (1-2-6).

Formula (1-2-1)

Formula (1-2-2)

Formula (1-2-3)

Formula (1-2-4)

Formula (1-2-5)

Formula (1-2-6)

Formula (1-2-7)

Formula (1-2-8)

In an embodiment, the molar ratio of the group represented by Formula (1-1) to the group represented by Formula (1-2) is 0.1:0.2 to 0.6, and preferably 0.4 to 0.6. When the molar ratio of the group represented by Formula (1-1) to the group represented by Formula (1-2) is within the above range, the polyimide resin composition has good chemical resistance and adhesion, and is suitable for the manufacture of electronic components. In addition, when the molar ratio of the group represented by Formula (1-1) to the group represented by Formula (1-2) is not within the above range, the polyimide resin composition cannot have good chemical resistance and adhesion at the same time, and cannot be applied to the manufacture of electronic components. Furthermore, when the molar ratio of the group represented by Formula (1-1) to the group represented by Formula (1-2) is 0.1:greater than 0.6, the adhesion of the polyimide resin composition is poor. When the molar ratio of the group represented by Formula (1-1) to the group represented by Formula (1-2) is 0.1:less than 0.2, the chemical resistance of the polyimide resin composition is poor.

In an embodiment, the polyimide resin may further include a structural unit represented by general Formula (2).

Formula (2)

In Formula (2), Ar$^1$ is a tetravalent organic group, and Ar$^3$ is a group represented by following Formula (2-1).

The description of Ar$^1$ in Formula (2) is the same as the description of Ar$^1$ in Formula (1), and will not be repeated here.

Formula (2-1)

In Formula (2-1), Y is —C(CH$_3$)$_2$—, —C(CF$_3$)$_2$—, —CH$_2$—, —O—, —S—, or —SO$_2$—, preferably —C(CH$_3$)$_2$— or —C(CF$_3$)$_2$—, and more preferably —C(CH$_3$)$_2$—; and * represents the bonding position.

The molar ratio of the group represented by Formula (1-1) to the group represented by Formula (2-1) is 1:greater than 0 to less than or equal to 4, and preferably 1:2 to 4. When the molar ratio of the group represented by Formula (1-1) to the group represented by Formula (2-1) is within the above range, the polyimide resin composition may have better chemical resistance and adhesion.

Formula (2-1) is preferably a group represented by following Formula (2-1-1) or Formula (2-1-2), and more preferably a group represented by Formula (2-1-1). The group represented by Formula (2-1-1) is derived from 2,2-bis(3-amino-4-hydroxyphenyl)propane; and the group represented by Formula (2-1-2) may be derived from 2,2-bis(3-amino-4-hydroxyphenyl)hexafluoropropane.

Formula (2-1-1)

Formula (2-1-2)

In an embodiment, the polyimide resin may further include a structural unit represented by the general Formula (3).

Formula (3)

In Formula (3), $Ar^1$ is a tetravalent organic group; and $Ar^4$ is a group represented by following Formula (3-1). The group represented by Formula (3-1) may be derived from 3,4'-diaminodiphenyl ether.

The description of $Ar^1$ in Formula (3) is the same as the description of $Ar^1$ in Formula (1), and will not be repeated here.

Formula (3-1)

In Formula (3-1), * represents the bonding position.

In an embodiment, $Ar^1$ in the above Formulas (1) to (3) is a group represented by following Formula (1-a).

Formula (1-a)

In Formula (1-a), * represents the bonding position.

The weight-average molecular weight of the polyimide resin is 5,000 to 50,000, preferably 10,000 to 40,000, and more preferably 25,000 to 35,000.

Solvent (C)

In an embodiment, the polyimide resin composition may further include a solvent (C). The solvent (C) is not particularly limited, as long as it can dissolve the polyimide resin and other compositions in the polyimide resin composition and does not react with other compositions of the polyimide resin composition. The solvent (C) is preferably the solvent used when synthesizing the polyimide resin.

Specific examples of the solvent (C) include, but are not limited to, N-methylpyrrolidone, γ-butyrolactone, γ-butyrolamide, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate or N,N-dimethylformamide or N,N-dimethyl acetamide, or a combination of the above solvents.

Based on that the polyimide resin (A) is 100 parts by weight, the usage amount of the solvent (C) is 800 to 4000 parts by weight, preferably 900 to 3500 parts by weight, and more preferably 1000 to 3000 parts by weight.

Additive (D)

In an embodiment, in addition to the polyimide resin, the polyimide resin composition may further include an additive (D) without affecting the efficacy of this embodiment. The additive is not particularly limited and may be appropriately selected according to requirements. Specifically, the additive may include inorganic particles, antioxidants, anti-aging agents, or a combination thereof.

<Manufacturing Method of Electronic Component>

Figure 1:
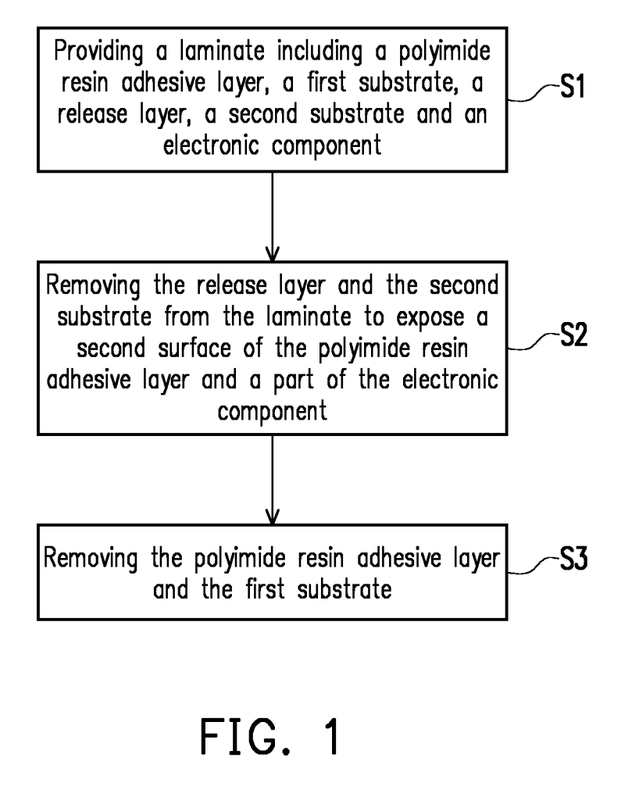
FIG. 1 is a flowchart of a manufacturing method of an electronic component according to an embodiment of the disclosure.

FIG. 1 is a flowchart of a manufacturing method of an electronic component according to an embodiment of the disclosure, which is particularly suitable for manufacturing a micro light emitting diode (micro LED). More specifically, if the manufacturing method of the electronic component is used to manufacture the micro LED, mass transfer can be implemented to achieve the efficacy of transferring a huge amount of the micro LED to a specific substrate at a time. In this embodiment, the manufacturing method of the electronic component includes: Step S1:

providing a laminate including a polyimide resin adhesive layer, a first substrate, a release layer, a second substrate, and an electronic component; Step S2: removing the release layer and the second substrate from the laminate to expose a second surface of the polyimide resin adhesive layer and a part of the electronic component; and Step S3: removing the polyimide resin adhesive layer and the first substrate.

Figure 2A:
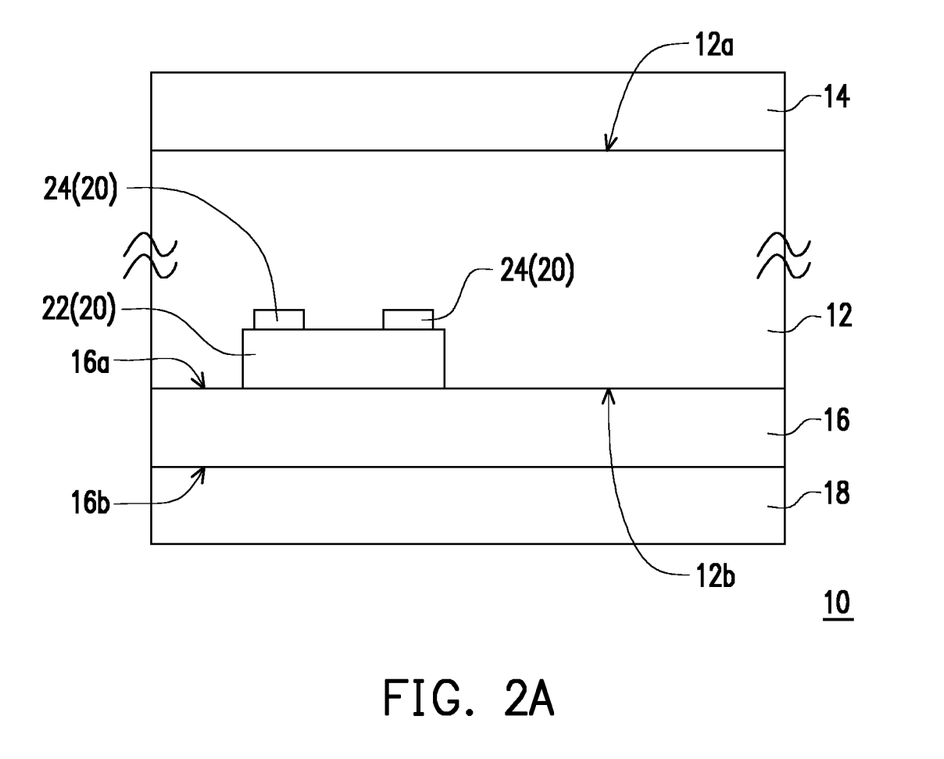
FIG. 2A to FIG. 2C are schematic diagrams of a manufacturing method of an electronic component according to an embodiment of the disclosure.
Figure 2B:
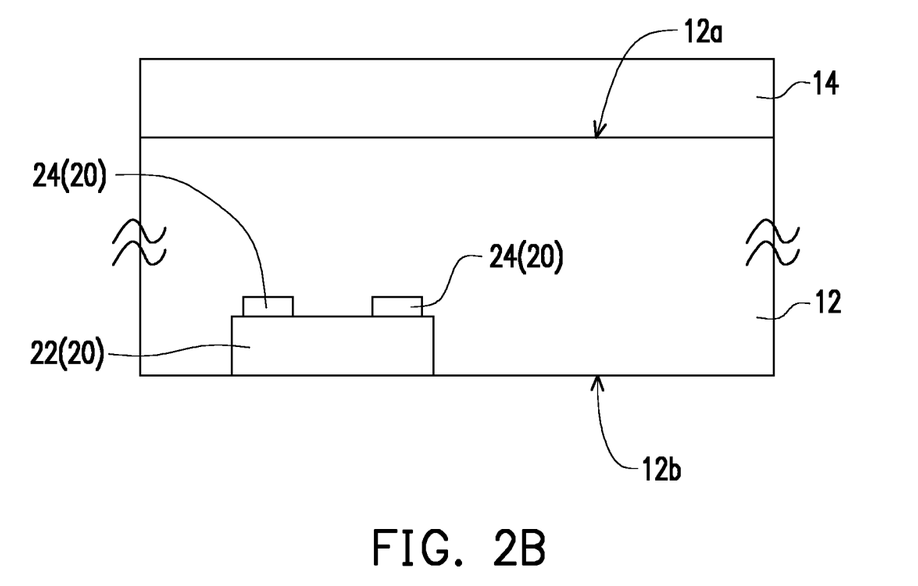
Figure 2C:
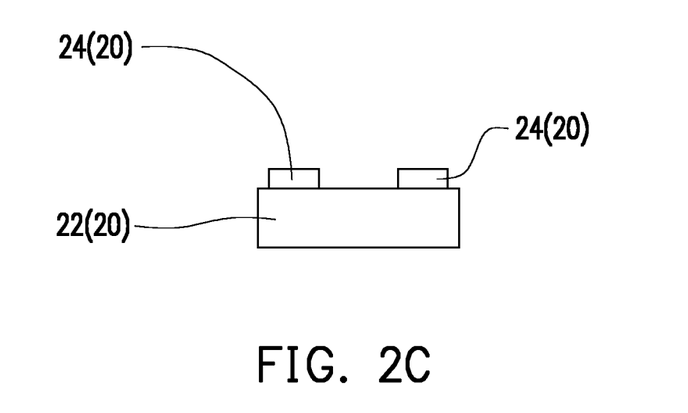

FIG. 2A to FIG. 2C are schematic diagrams of a manufacturing method of an electronic component according to an embodiment of the disclosure.

First, referring to FIG. 1 and FIG. 2A at the same time, in Step S1, a laminate 10 is provided. The laminate 10 includes a polyimide resin adhesive layer 12, a first substrate 14, a release layer 16, a second substrate 18, and an electronic component 20. The polyimide resin adhesive layer 12 has a first surface 12a and a second surface 12b opposite to each other. The release layer 16 has a third surface 16a and a fourth surface 16b opposite to each other. The first substrate 14 is bonded to the first surface 12a of the polyimide resin adhesive layer 12. The third surface 16a of the release layer 16 is bonded to the second surface 12b of the polyimide resin adhesive layer 12. The second substrate 18 is bonded to the fourth surface 16b of the release layer 16. The electronic component 20 is embedded in the polyimide resin adhesive layer 12, and the electronic component 20 is connected to the release layer 16.

The polyimide resin adhesive layer 12 is formed by the polyimide resin compositions.

The first substrate 14 is, for example, a hard substrate such as a glass substrate, a quartz substrate, or a sapphire substrate.

The release layer 16 is, for example, a layer such as a metal layer or a polymer layer that may be separated from the polyimide resin adhesive layer 12 by mechanical exfoliation. The metal layer may be a copper layer or an aluminum layer, and the material of the polymer layer may be poly propylene oxide (PPO), polyethylene terephthalate (PET), epoxy resin, acrylic, fluorine resin, or other high temperature resistant polymers.

The second substrate 18 is, for example, a glass substrate, a quartz substrate, or a sapphire substrate, but is not limited thereto.

The electronic component 20 is, for example, a light emitting diode 20. As shown in FIG. 2A, the light emitting diode 20 includes an epitaxial layer 22 and two electrodes 24. The two electrodes 24 are disposed on the epitaxial layer 22. In this embodiment, the two electrodes 24 may be disposed on a same side of the epitaxial layer 22, but the disclosure is not limited thereto, and the two electrodes 24 may also be respectively disposed on opposite sides of the epitaxial layer 22. In addition, the light emitting diode 20 is embedded in the polyimide resin adhesive layer 12, and the light emitting diode 20 may be connected to the release layer 16 through the exposed part of the polyimide resin adhesive layer. In an embodiment, the light emitting diode 20 is connected to the release layer 16 through the epitaxial layer 22. The epitaxial layer 22 may include a first type semiconductor layer (not shown), a second type semiconductor layer (not shown), and a light emitting layer (not shown). The light emitting layer is located between the first type semiconductor layer and the second type semiconductor layer. The first type semiconductor layer and the second type semiconductor layer are electrically connected to the two electrodes 24 respectively. The first type semiconductor layer is, for example, an n-type semiconductor layer, and the second type semiconductor layer is, for example, a p-type semiconductor layer, but is not limited thereto. The light emitting layer is not particularly limited, and appropriate materials may be selected according to requirements. The two electrodes 24 are, for example, conductive metals such as gold, silver, and copper, but are not limited thereto. In an embodiment, the light emitting diode 20 may further include a transparent conductive layer (not shown). The transparent conductive layer is, for example, indium tin oxide, aluminum-doped zinc oxide, or indium zinc oxide.

The lamination method of the laminate 10 is not particularly limited. For example, the polyimide resin composition is coated on the first substrate 14 to form the polyimide resin adhesive layer 12; the electronic component 20 is embedded in the polyimide resin adhesive layer 12, and a part of the electronic component 20 is exposed; and the release layer 16 and the second substrate 18 are sequentially laminated on the second surface 12b of the polyimide resin adhesive layer 12 and the exposed part of the electronic component 20.

Next, referring to FIG. 1 and FIG. 2B at the same time, in Step S2, the release layer 16 and the second substrate 18 are removed from the laminate 10 to expose the second surface 12b of the polyimide resin adhesive layer 12 and the part of the electronic component 20. The method for removing the release layer 16 and the second substrate 18 is not particularly limited. For example, the release layer 16 and the second substrate 18 are peeled off from the second surface of the polyimide resin adhesive layer 12 by the mechanical exfoliation.

Next, referring to FIG. 1 and FIG. 2C at the same time, in Step S3, the polyimide resin adhesive layer 12 and the first substrate 14 are removed. The manner of removing the polyimide resin adhesive layer 12 and the first substrate 14 is not particularly limited. For example, the mechanical exfoliation, solvent exfoliation, or a combination thereof is performed. The conditions of the mechanical exfoliation are not particularly limited, and for example, the mechanical exfoliation may be performed at room temperature. A first organic solvent used in the solvent exfoliation is not particularly limited, as long as the first organic solvent can dissolve the polyimide resin adhesive layer 12 without damaging the electronic component 20. In addition, in other embodiments of the disclosure, an organic structure layer (not shown) may also be formed on the electronic component 20.

In the manufacturing method of the electronic component according to an embodiment, after Step S1, a pressurization step may be further included, so that the electronic component 20 may be reliably embedded in the polyimide resin adhesive layer 12 and fixed between the first substrate 14 and the second substrate 18. The pressurization step is not particularly limited, and an appropriate pressurization method may be selected according to requirements.

In the manufacturing method of the electronic component according to an embodiment, after Step S3, a step of removing the residual glue on the first substrate 14 and the second substrate 18 with a second organic solvent or an alkaline solution may be further included. The second organic solvent is not particularly limited, as long as it can dissolve the polyimide resin adhesive layer 12 without damaging the first substrate 14 and the second substrate 18. The second organic solvent is preferably the same as the first organic solvent.

Hereinafter, the disclosure will be described in detail with reference to experimental examples. The following experimental examples are provided to describe the disclosure, and the scope of the disclosure includes the scope, substitutions, and modifications described in the following claims, and is not limited to the scope of the experiments.

EXPERIMENTAL AND COMPARATIVE EXAMPLES OF POLYIMIDE RESIN

Experimental examples 1 and 2, and Comparative examples 1 to 4 of the polyimide resin composition will be described as follows:

Experimental Example 1

8.981 g (0.036 mol) of 1,3-bis(3-aminopropyl)-1,1,3,3-tetramethyldisiloxane, 59.340 g (0.145 mol) of 2,2'-bis[4-(4-aminophenoxy)phenyl]propane, 37.340 g (0.145 mol) of 2,2-bis(3-amino-4-hydroxyphenyl)propane, 7.236 g (0.036 mol) of 3,4-diaminodiphenyl ether, and 112.103 g (0.36 mol) of 3,3',4,4'-diphenyl ether tetracarboxylic dianhydride were added into a 1000 ml three-neck round-bottom flask equipped with nitrogen gas and a mechanical stirrer. Then, 673.200 g of N-methylpyrrolidone was added as a solvent, and the mixture was stirred for 4 hours at 70° C. Then, 1.800 g of 1-ethylpiperidine was added as a catalyst, and the temperature was raised to 180° C. and the mixture was stirred for 4 hours. After cooling, the polyimide resin composition solution of Experimental Example 1 was obtained.

Experimental Example 2 and Comparative Examples 1 and 3

Polyimide resin compositions of Experimental Example 2 and Comparative Examples 1 and 3 were prepared with the same steps as Experimental Example 1, and the differences were that the composition types and usage amounts of the polyimide resin compositions were changed (as shown in Table 1). The obtained polyimide resin compositions were formed into films and evaluated in each of the following evaluation manners. The results are shown in Table 1.

Comparative Example 2

17.101 g (0.069 mol) of 1,3-bis(3-aminopropyl)-1,1,3,3-tetramethyldisiloxane, 88.878 g (0.344 mol) of 2,2-bis(3-amino-4-hydroxyphenyl)propane, 48.226 g (0.241 mol) of 3,4-diaminodiphenyl ether, and 170.785 g (0.688 mol) of bicyclo[2.2.2]oct-7-ene-2,3,5,6-tetracarboxylic dianhydride were added into a 1000 ml three-neck round-bottom flask equipped with nitrogen gas and a mechanical stirrer. Then, 647.20 g of γ-butyrolactone was added as a solvent, and the mixture was stirred for 4 hours at 70° C. Then, 7.509 g (0.069 mol) of sealing agent 3-aminophenol was added, and the mixture was stirred for another 4 hours at 70° C. Then, 2.660 g of 1-ethylpiperidine was added as a catalyst, and the temperature was raised to 180° C. and the mixture was stirred for 4 hours. After cooling, the polyimide resin composition solution of Comparative Example 2 was obtained.

Comparative Example 4

The polyimide resin composition of Comparative Example 4 was prepared with the same steps as Comparative Example 2, and the differences were that the composition types and usage amounts of the polyimide resin composition were changed (as shown in Table 1). The film formed by the obtained polyimide resin composition was evaluated in each of the following evaluation manners. The results are shown in Table 1.

TABLE 1

|  |  |  |  | Unit | Experimental Example 1 | Experimental Example 2 | Comparative Example 1 | Comparative Example 2 | Comparative Example 3 | Comparative Example 4 |
|---|---|---|---|---|---|---|---|---|---|---|
| Diamine (A) | A-1 | 1,3-bis(3-aminopropyl)-1,1,3,3-tetramethyldisiloxane | | Number of moles | 0.036 | 0.035 | 0.033 | 0.069 | 0.059 | 0.067 |
|  |  |  |  | Molar ratio | 0.1 | 0.1 | 0.1 | 0.1 | 0.1 | 0.1 |
|  | A-2 | 2,2'-bis[4-(4-aminophenoxy)phenyl]propane | | Number of moles | 0.015 | 0.210 | 0.260 | 0 | 0 | 0 |
|  |  |  |  | Molar ratio | 0.4 | 0.6 | 0.8 | 0 | 0 | 0 |
|  | A-3 | 2,2-bis(3-amino-4-hydroxyphenyl)propane | | Number of moles | 0.0145 | 0.070 | 0 | 0.344 | 0.471 | 0.334 |
|  |  |  |  | Molar ratio | 0.4 | 0.2 | 0 | 0.5 | 0.8 | 0.5 |
|  | A-4 | 3,4-diaminodiphenyl ether | | Number of moles | 0.036 | 0.035 | 0.033 | 0.241 | 0.059 | 0.117 |
|  |  |  |  | Molar ratio | 0.1 | 0.1 | 0.1 | 0.35 | 0.1 | 0.175 |
|  | A'-1 | 3,3'-dicarboxy-4,4'-diaminodiphenylmethane | | Number of moles | 0 | 0 | 0 | 0 | 0 | 0.117 |
|  |  |  |  | Molar ratio | 0 | 0 | 0 | 0 | 0 | 0.175 |
|  | A'-2 | 3-aminophenol | | Number of moles | 0 | 0 | 0 | 0.069 | 0 | 0.067 |
|  |  |  |  | Molar ratio | 0 | 0 | 0 | 0.1 | 0 | 0.1 |
| Tetracarboxylic dianhydride (B) | B-1 | 3,3',4,4'-diphenyl ether tetracarboxylic dianhydride | | Number of moles | 0.360 | 0.345 | 0.330 | 0 | 0.590 | 0 |
|  |  |  |  | Molar ratio | 1 | 1 | 1 | 0 | 1 | 0 |
|  | B-2 | bicyclo[2.2.2]oct-7-ene-2,3,5,6-tetracarboxylic dianhydride | | Number of moles | 0 | 0 | 0 | 0.688 | 0 | 0.667 |
|  |  |  |  | Molar ratio | 0 | 0 | 0 | 1 | 0 | 1 |
| Solvent (C) | C-1 | N-methylpyrrolidone | | Gram | 673.200 | 673.200 | 614.840 | 0 | 614.840 | 0 |
|  | C-2 | γ-butyrolactone | | Gram | 0 | 0 | 0 | 647.200 | 0 | 614.840 |
| Catalyst |  | 1-ethylpiperidine | | Gram | 1.800 | 1.800 | 2.660 | 2.660 | 2.660 | 2.660 |
| Evaluation manner |  | Chemical resistance (TMAH2.38%) | | | ○ | ○ | ○ | X | X | X |
|  |  | Chemical resistance (PGMEA) | | | ○ | ○ | ○ | X | X | X |
|  |  | Adhesion | | | ○ | ○ | X | X | ○ | X |

The sources of the compositions/compounds in Table 1 are shown in Table 2 below.

TABLE 2

|  | Composition/Compound | Source |
|---|---|---|
| A-1 | 1,3-bis(3-aminopropyl)-1,1,3,3-tetramethyldisiloxane (diamine with silicon-oxygen bond) | ECHO CHEMICAL CO., LTD. |
| A-2 | 2,2'-bis[4-(4-aminophenoxy)phenyl]propane (BAPP) (diamine with four benzene rings) | TONG SING CHEMICALS CO., LTD. |
| A-3 | 2,2-bis(3-amino-4-hydroxyphenyl)propane (BAHPP) | Manufactured by Tokyo Chemical Industry Co., Ltd. |

TABLE 2-continued

| Composition/Compound | | Source |
|---|---|---|
| A-4 | 3,4-diaminodiphenyl ether (3,4-DPE) | Merck KGaA |
| A'-1 | 3,3'-dicarboxy-4,4'-diaminodiphenylmethane | SHIFENG TECHNOLOGY |
| A'-2 | 3-aminophenol (sealing agent) | ECHO CHEMICAL CO., LTD. |
| B-1 | 3,3',4,4'-diphenyl ether tetracarboxylic dianhydride (ODPA) | TONG SING CHEMICALS CO., LTD. |
| B-2 | bicyclo[2.2.2]oct-7-ene-2,3,5,6-tetracarboxylic dianhydride (BTA) | Manufactured by Tokyo Chemical Industry Co., Ltd. |
| C-1 | N-methylpyrrolidone (NMP) | Manufactured by SHINY CHEMICAL INDUSTRIAL CO., LTD. |
| C-2 | γ-butyrolactone solvent (GBL) | Manufactured by SHINY CHEMICAL INDUSTRIAL CO., LTD. |

<Evaluation Manner>

I. Chemical Resistance

The spin coating method (the spin coater model Clean Track MK-8, manufactured by Tokyo Electron Limited (TEL) with a rotating speed of 1200 rpm) was used to coat each of the polyimide resin composition solutions obtained in the experimental examples and comparative examples onto a first glass substrate. Then, soft bake was performed for 300 seconds at a temperature of 110° C. to form polyimide resin composition films with a thickness of 1.5 μm.

The polyimide resin composition films were respectively immersed in tetramethylammonium hydroxide (TMAH) or propylene glycol monomethyl ether acetate (PGMEA) with a concentration of 2.38% by weight for 5 minutes. Then, changes in the polyimide resin composition films were observed.

The evaluation criterion of the chemical resistance is as follows:
  ○: The polyimide resin composition film had no cracks and no dissolution.
  X: The polyimide resin composition film was cracked or dissolved.

II. Adhesion

The spin coating method (the spin coater model Clean Track MK-8, manufactured by Tokyo Electron Limited (TEL) with a rotating speed of 1200 rpm) was used to coat each of the polyimide resin composition solutions obtained in the experimental examples and comparative examples onto the first glass substrate. Then, soft bake was performed for 300 seconds at a temperature of 110° C. to form polyimide resin composition films with a thickness of 1.5 μm. Then, a second glass substrate was covered on the polyimide resin composition films, so that the polyimide resin composition films were sandwiched between the first glass substrate and the second glass substrate. Then, a pressure of 500 kg was applied to the first glass substrate and the second glass substrate. Finally, the same was put into the oven for 15 minutes at 170° C. Whether the polyimide resin composition films and the glass substrates were bonded together was macroscopically observed.

The evaluation criterion for the adhesion is as follows:
  ○: The polyimide resin composition film was bonded to the glass substrates.
  X: The polyimide resin composition film could not be bonded to the glass substrates.

<Evaluation Result>

It can be seen from Table 1 that when the molar ratio of the diamine having silicon-oxygen bond to the diamine having four benzene rings is in the range of 0.1:0.2 to 0.6 (Experimental Examples 1 and 2), the polyimide resin composition has good chemical resistance and adhesion.

In contrast, when the molar ratio of the diamine having silicon-oxygen bond to the diamine having four benzene rings is not within the range of 0.1:0.2 to 0.6 (Comparative Examples 1 to 4), the polyimide resin composition cannot have good chemical resistance and adhesion at the same time. Furthermore, when the molar ratio of the diamine having four benzene rings is 0.1:greater than 0.6 (Comparative Example 1), the adhesion of the polyimide resin composition is poor. When the molar ratio of the diamine having four benzene rings is 0.1:less than 0.2 (Comparative Examples 2 to 4), the chemical resistance of the polyimide resin composition is poor.

In summary, the disclosure provides a polyimide resin composition, which includes the polyimide resin synthesized by the diamine having silicon-oxygen bond and the diamine having four benzene rings in the molar ratio of 0.1:0.2 to 0.6. The polyimide resin composition has good chemical resistance and adhesion, and is suitable for the manufacture of electronic components. In addition, the disclosure also provides a polyimide resin adhesive layer formed by the polyimide resin composition, a laminate including the polyimide resin adhesive layer, and a manufacturing method of an electronic component.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A polyimide resin composition, comprising a polyimide resin, wherein the polyimide resin is essentially obtained by a polymerization reaction of a diamine (A) and a tetracarboxylic dianhydride (B), the diamine (A) comprises a diamine (A-1) represented by following Formula (I-1), a diamine (A-2) represented by following Formula (I-2), a diamine (A-3) represented by following Formula (I-3), and 3,4'-diaminodiphenyl ether, wherein a molar ratio ((A-1):(A-2)) of the diamine (A-1) to the diamine (A-2) is 0.1:0.2 to 0.6, and a molar ratio ((A-1):(A-3)) of the diamine (A-1) to the diamine (A-3) is 1:greater than 0 to less than or equal to 4, Formula (I-1)

in Formula (I-1), m1 is an integer of 1 to 3, m2 is an integer of 1 to 3, and each $X^1$ is an alkyl group having a carbon number of 1 to 5 or a phenylene group, wherein when $X^1$ is the alkyl group having the carbon number of 1 to 5, any —CH$_2$— of the alkyl group having the carbon number of 1 to 5 may be substituted by —NH—,

Formula (I-2)

in Formula (I-2), $X^2$ is a hydrocarbon group having a carbon number of 1 to 10, —O—, —S—, —SO$_2$—, —NH—, —C(CF$_3$)$_2$—, or Formula (I-3)

in Formula (1-3), Y is -C(CH$_3$)$_2$—, —C(CF$_3$)$_2$—, —CH$_2$—, —O—, —S—, or —SO$_2$—.

2. The polyimide resin composition according to claim 1, wherein the tetracarboxylic dianhydride (B) comprises 3,3',4,4'-diphenyl ether tetracarboxylic dianhydride.

3. A polyimide resin composition, comprising a polyimide resin, wherein the polyimide resin comprises a structural unit represented by general Formula (1), a structural unit represented by general Formula (2), and a structural unit represented by general Formula (3), Formula (1)

in Formula (1), Ar$^1$ is a tetravalent organic group, and Ar$^2$ is a group represented by following Formula (1-1) or a group represented by following Formula (1-2), wherein a molar ratio of the group represented by Formula (1-1) to the group represented by Formula (1-2) is 0.1:0.2 to 0.6, Formula (1-1)

in Formula (1-1), m1 is an integer of 1 to 3, m2 is an integer of 1 to 3, and each $X^1$ is an alkyl group having a carbon number of 1 to 5 or a phenylene group, wherein when $X^1$ is the alkyl group having the carbon number of 1 to 5, any —CH$_2$— of the alkyl group having the carbon number of 1 to 5 may be substituted by —NH—, and * represents a bonding position, Formula (1-2)

in Formula (1-2), $X^2$ is a hydrocarbon group having a carbon number of 1 to 10, —O—, —S—, —SO$_2$—, —NH—, —C(CF$_3$)$_2$—, or and * represents a bonding position,

Formula (2)

in Formula (2), Ar$^1$ is a tetravalent organic group, and Ar$^3$ is a group represented by following Formula (2-1), wherein a molar ratio of the group represented by Formula (1-1) to the group represented by Formula (2-1) is 1:greater than 0 to less than or equal to 4, Formula (2-1)

in Formula (2-1), Y is —C(CH$_3$)$_2$—, —C(CF$_3$)$_2$—, —CH$_2$—, —O—, —S—, or —SO$_2$—, and * represents a bonding position, Formula (3)

in Formula (3), $Ar^1$ is a tetravalent organic group, and $Ar^4$ is a group represented by following Formula (3-1), Formula (3-1)

in Formula (3-1), * represents a bonding position.

4. The polyimide resin composition according to claim 3, wherein $Ar^1$ in Formula (1) is a group represented by following Formula (1-a), Formula (1-a)

in Formula (1-a), * represents a bonding position.

5. The polyimide resin composition according to claim 3, wherein $Ar^1$ in Formula (2) is a group represented by following Formula (1-a), Formula (1-a)

in Formula (1-a), * represents a bonding position.

6. The polyimide resin composition according to claim 3, wherein $Ar^1$ in Formula (3) is a group represented by following Formula (1-a), Formula (1-a)

in Formula (1-a), * represents a bonding position.

7. A polyimide resin adhesive layer, formed by the polyimide resin composition according to claim 1.

8. A laminate, comprising:
the polyimide resin adhesive layer according to claim 7, having a first surface and a second surface opposite to each other;
a first substrate, bonded to the first surface of the polyimide resin adhesive layer;
a release layer, having a third surface and a fourth surface opposite to each other, wherein the third surface of the release layer is bonded to the second surface of the polyimide resin adhesive layer;
a second substrate, bonded to the fourth surface of the release layer; and
an electronic component, embedded in the polyimide resin adhesive layer and connected to the release layer.

9. A manufacturing method of an electronic component, comprising:
providing the laminate according to claim 8;
removing the release layer and the second substrate from the laminate to expose the second surface of the polyimide resin adhesive layer and a part of the electronic component; and
removing the polyimide resin adhesive layer and the first substrate.

10. The manufacturing method of the electronic component according to claim 9, wherein the electronic component is a light emitting diode.

11. A polyimide resin adhesive layer, formed by the polyimide resin composition according to claim 3.

12. A laminate, comprising:
the polyimide resin adhesive layer according to claim 11, having a first surface and a second surface opposite to each other;
a first substrate, bonded to the first surface of the polyimide resin adhesive layer;
a release layer, having a third surface and a fourth surface opposite to each other, wherein the third surface of the release layer is bonded to the second surface of the polyimide resin adhesive layer;
a second substrate, bonded to the fourth surface of the release layer; and
an electronic component, embedded in the polyimide resin adhesive layer and connected to the release layer.

13. A manufacturing method of an electronic component, comprising:
providing the laminate according to claim 12;
removing the release layer and the second substrate from the laminate to expose the second surface of the polyimide resin adhesive layer and a part of the electronic component; and
removing the polyimide resin adhesive layer and the first substrate.

14. The manufacturing method of the electronic component according to claim 13, wherein the electronic component is a light emitting diode.

* * * * *